United States Patent
Filippi et al.

(10) Patent No.: US 7,638,038 B2
(45) Date of Patent: Dec. 29, 2009

(54) METHOD AND REACTOR FOR CARRYING OUT CHEMICAL REACTIONS IN PSEUDO-ISOTHERMAL CONDITIONS

(75) Inventors: Ermanno Filippi, Castagnola (CH); Enrico Rizzi, Grandate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 710 days.

(21) Appl. No.: 10/493,036

(22) PCT Filed: Oct. 2, 2002

(86) PCT No.: PCT/EP02/11026

§ 371 (c)(1),
(2), (4) Date: Apr. 19, 2004

(87) PCT Pub. No.: WO03/035242

PCT Pub. Date: May 1, 2003

(65) Prior Publication Data

US 2004/0266893 A1 Dec. 30, 2004

(30) Foreign Application Priority Data

Oct. 19, 2001 (EP) .................................. 01124966

(51) Int. Cl.
 - *C10G 51/06* (2006.01)
 - *C10G 47/00* (2006.01)
 - *F28F 27/02* (2006.01)
 - *F28D 7/00* (2006.01)
 - *B01J 19/00* (2006.01)

(52) U.S. Cl. .................... 208/78; 208/107; 165/96; 165/97; 165/100; 165/101; 422/143; 422/144; 422/146; 422/198; 422/200; 422/201; 422/211; 518/726; 518/712

(58) Field of Classification Search ............... 165/58, 165/65, 96, 97, 100, 101; 422/143, 200, 422/144, 146, 198, 201, 211; 208/78, 107; 518/712, 726

See application file for complete search history.

(56) References Cited

U.S. PATENT DOCUMENTS

| | | | | |
|---|---|---|---|---|
| 1,235,057 A | * | 7/1917 | Roberson | 165/149 |
| 2,420,373 A | * | 5/1947 | Hogberg | 432/217 |
| 2,662,911 A | * | 12/1953 | Dorschner et al. | 518/712 |
| 2,740,803 A | * | 4/1956 | Dorschner | 518/712 |
| 2,853,371 A | * | 9/1958 | Christensen et al. | 422/200 |
| 3,132,691 A | * | 5/1964 | Esleeck | 165/134.1 |

(Continued)

FOREIGN PATENT DOCUMENTS

DE 198 06 810 A1 8/1999

(Continued)

*Primary Examiner*—Walter D Griffin
*Assistant Examiner*—Huy-Tram Nguyen
(74) *Attorney, Agent, or Firm*—Akerman Senterfitt (57) ABSTRACT

A method for controlling the pseudo-isothermicity of a chemical reaction in a respective reaction zone. (9) in which the use of heat exchangers (6) is foreseen having an operating heat exchange fluid flowing through them and in which heat exchange critical areas (9a) are identified, the method being distinguished by the fact that it reduces and controls, in the critical areas (9a) of the reaction zone, the value of the heat exchange coefficient between the operating fluid and the zone (9), through thermal insulation of the portions (6a, 6b) of such exchangers extending in such areas (9a).

6 Claims, 6 Drawing Sheets

U.S. PATENT DOCUMENTS

| | | | |
|---|---|---|---|
| 3,156,538 A | | 11/1964 | Schneider |
| 3,903,964 A | * | 9/1975 | Van Doorn et al. ........... 165/158 |
| 3,982,901 A | * | 9/1976 | Steever et al. ................ 422/143 |
| 4,405,440 A | * | 9/1983 | Gwyn ....................... 208/48 Q |
| 4,537,249 A | | 8/1985 | Harris |
| 4,732,918 A | * | 3/1988 | Lohmueller et al. .......... 518/712 |
| 5,277,245 A | * | 1/1994 | Dutta et al. ............ 165/104.16 |
| 5,504,307 A | * | 4/1996 | Hayashi et al. .............. 219/543 |
| 5,630,470 A | * | 5/1997 | Lockwood, Jr. ............... 165/82 |

FOREIGN PATENT DOCUMENTS

| | | |
|---|---|---|
| GB | 758538 A1 | 10/1956 |
| WO | WO 02/00548 A1 | 1/2002 |

\* cited by examiner

METHOD AND REACTOR FOR CARRYING OUT CHEMICAL REACTIONS IN PSEUDO-ISOTHERMAL CONDITIONS

FIELD OF APPLICATION

In its most general aspect the present invention refers to a method for carrying out chemical reactions in so-called pseudo-isothermal conditions, in other words in conditions such that the reaction temperature is controlled in a limited range of values around a predetermined optimal value.

In particular, this invention concerns a method of the aforementioned type for controlling the temperature of catalyzed reactions, based upon the use of heat exchangers in contact with the reaction zone.

Even more particularly, but not exclusively, the present invention refers to a method in which the control of the reaction temperature is obtained through the use of tubular or plate-shaped heat exchangers, immersed in a catalytic bed in which a predetermined chemical reaction takes place and internally crossed by an appropriate heat exchange operating fluid.

The present invention also refers to a heat exchanger structured for carrying out the aforementioned method.

PRIOR ART

It is known that for an optimal completion of exothermic and endothermic chemical reactions, like for example synthesis reactions of ammonia, methanol, formaldehyde or styrene, respectively, it is necessary to either remove or respectively supply heat to the zone in which the reaction takes place so as to control its temperature within given limits around a predetermined theoretical value.

And it is also known that, for the aforementioned purpose, different kinds of heat exchange units are widely used, for example of the tube bundle type, i.e. comprising a plurality of tubular heat exchangers, or else made of plates, i.e. comprising a plurality of plate elements substantially box-shaped, the one placed next to the other, as heat exchangers.

The tubes or the plate-shaped elements can be immersed in the reaction zone (generally a catalytic bed) and can be internally crossed by an appropriate heat exchange operating fluid. Otherwise, in the case of tubular bundle heat exchangers, the tubes can be filled with catalyst and can have a reactant fluid passing through them whereas on the outside they are licked by the heat exchange operating fluid.

The degree of pseudo-isothermicity of the reaction and thus the degree of advancement or completion of the reaction itself depends in particular on the ability of the tube bundle or of the plate-shaped elements to supply or remove heat to or from the reaction zone (heat transfer efficiency).

On the other hand, the complexity in structure and use of such exchangers has made it such that in the field a way has always been sought for maximizing the heat exchange between the operating fluid and the gaseous reactants and at the same time to reduce as much as possible the heat exchange surface (and therefore the number of tubes or of plates) required to obtain the desired degree of pseudo-isothermicity of the reaction.

All this in order to simplify the manufacture of such heat exchange units and to ease their operation and control.

From studies carried out by the applicant, it was surprisingly noted that, as much as they are favourable in many aspects, the methods of prior art adopted up to now to conduct a chemical reaction in pseudo-isothermal conditions, have a serious drawback which constitutes, on the industrial scale, a certain limit to the degree of advancement or completion of the reaction itself.

The operating fluid that flows through a heat exchanger following a predetermined inlet-outlet path, necessarily undergoes a substantial temperature variation, exchanging heat with the zone (for example a catalytic bed) in contact with such an exchanger.

To this temperature variation of the operating fluid, which is substantially continuous along such a path, it is necessary to mention that the reaction heat to be removed or supplied during the chemical reaction through the operating fluid is not constant but also varies with the variation of the concentration of the reactant fluid which flows inside the reaction zone.

Due to these temperature variations of the operating fluid and of the reaction heat, respectively, together with the requirement to limit as much as possible the heat exchange surface of the exchangers for the previously quoted reasons, it is necessary to feed the operating fluid (or a part of it) at a very different temperature (greater or lesser) with respect to that present in the reaction zone so as to avoid that during the chemical reaction the difference of temperature between inner and outer fluid, and therefore the heat exchange, is excessively reduced to the detriment of the operating efficiency of the exchanger.

In doing so, a recognized drastic reduction in the conversion yield of the reactant fluid generally takes place in particular areas of the reaction zone, next to the heat exchanger, which limit the degree of completion of the chemical reaction under consideration. These are areas that can be well defined in the reaction zone as a function of the chemical-physical characteristics of the catalytic bed (nature and particle size of the catalyst, its degree of compactness, thermodynamics and kinetics of the reaction, flow rate of the reactant gases and of the operating fluid used for the heat exchange, structure, shape, size and arrangement of the heat exchangers). These areas are defined in the rest of the description and in the subsequent claims with the term: "critical areas" of the reaction zone.

Indeed, it has been noted that in such critical areas an excessive temperature difference between heat exchange operating fluid and the reaction zone leads to a deceleration and in certain cases even to a turning-off of the reaction itself.

Consequently, the pseudo-isothermicity of the reaction conditions, achieved by methods and exchangers of the prior art, is characterized by a non-uniform reaction temperature inside the reaction zone, which is controlled within a range of values always relatively wide with respect to the around the one corresponding to the isotherm of reference, to the great detriment of the conversion yield of the chemical reaction being considered.

SUMMARY OF THE INVENTION

The technical problem underlying the present invention is that of providing a method for controlling the pseudo-isothermicity of a chemical reaction in a respective reaction zone in which the use of heat exchangers is foreseen, and which is capable of keeping the reaction temperature at a constant predetermined value or at least of controlling such a temperature within a very limited range of values also in the critical areas of the aforementioned zone, so as to overcome the cited drawback with reference to the prior art.

The technical problem outlined above is solved, according to the invention, by a method for controlling the pseudo-isothermicity of a chemical reaction in a respective reaction zone wherein the use of heat exchangers is foreseen crossed by a heat exchange operating fluid and whereas heat exchange critical areas are defined, such a method being characterized by reducing and controlling, in said critical areas of the reaction zone, the heat exchange coefficient value between said operating fluid and said zone, through thermal insulation of the portions of said exchangers extending in such areas.

By appropriately choosing the heat exchanger portions to be thermally insulated and the relative degree of thermal insulation, a suitable reduction of the heat exchange coefficient is advantageously obtained at such portions. It is thus possible to keep the temperature inside the reaction zone close to the heat exchanger, i.e. in said critical areas, within a very restricted range of values around a predetermined constant value (isotherm of reference) even when the temperature of the operating fluid is very different (greater or lesser) with respect to such a predetermined value.

It should be noted how the aforementioned characteristic of reducing in a controlled manner the heat exchange coefficient between the heat exchange operating fluid and the reaction zone in predetermined portions of the heat exchanger, is in clear contrast with the constant teaching of the prior art which, on the contrary, provides for maximizing such a heat exchange throughout all the heat exchanger.

Thanks to the present invention, it has surprisingly been noted that a targeted insulation of the heat exchanger, although locally reducing the heat exchange coefficient, allows the conversion yield of the reactant fluid in the areas of the reaction zone near to the thermally insulated heat exchanger portions to be substantially increased with respect to the methods of the prior art. And thus, it allows the desired degree of completion of the considered chemical reaction to be achieved. All this is obtained without having to vary the inlet temperature or flow rate of the heat exchange operating fluid.

The invention also refers to a heat exchanger with structural and functional features suitable for carrying out the aforementioned method.

The features and the advantages of a method according to the invention will become clearer from the following description of some indicative and non-limiting examples thereof, made with reference to the attached drawings.

DETAILED DESCRIPTION OF THE DRAWINGS

Figures 1, 2:
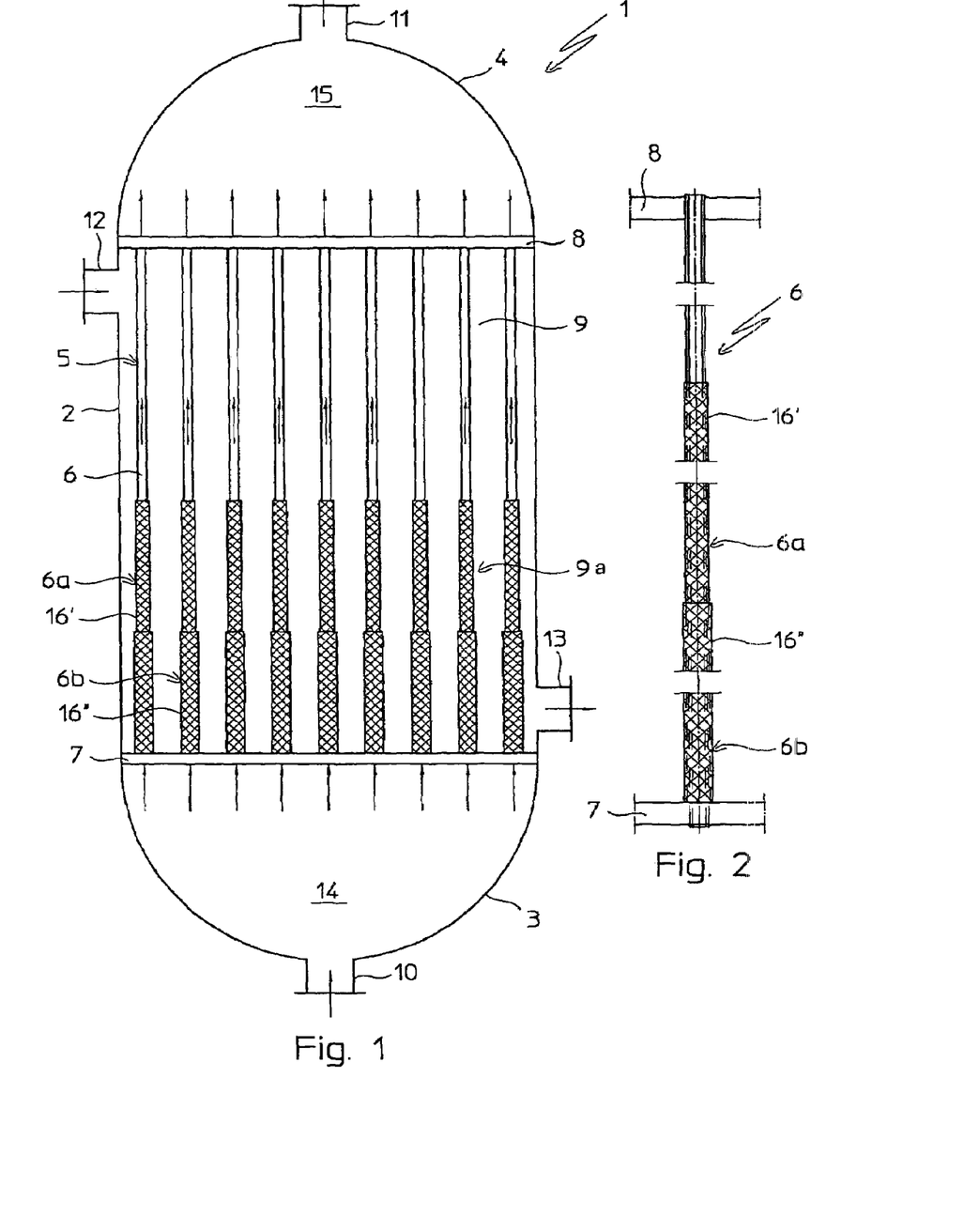
FIG. 1 schematically shows a longitudinal section view of a reactor for carrying out exothermic or endothermic chemical reactions comprising a heat exchange unit which can be used for carrying out the method according to the present invention.
FIG. 2 schematically shows an enlarged view of a detail of the heat exchange unit of FIG. 1.

With reference to FIGS. 1 and 2, with 1 a pseudo-isothermal reactor is wholly and schematically represented for carrying out exothermic or endothermic chemical reactions comprising a cylindrical shell 2, closed at the opposing ends by respective bottoms, lower 3 and upper 4.

Inside the shell 2 a heat exchange unit 5 of the tubular bundle type is housed, comprising a plurality of tubular heat exchangers, all indicated with 6, fixed at their ends to a lower tubular plate 7 and to an upper tubular plate 8, respectively.

Between the tubular plates 7 and 8 a reaction zone 9 is defined comprising a mass of an appropriate catalyst, not represented, suitably crossed by the heat exchangers 6.

The lower bottom 3 and the upper bottom 4 are equipped with nozzles 10 and 11 for the inlet into and outlet from the reactor 1 of a heat exchange operating fluid, respectively.

In turn, the shell 2 is equipped—near its upper ends with a nozzle 12 for the inlet into the reaction zone 9 of a reactant fluid, and—near its lower end—with a nozzle 13 for the outlet from such a zone 9 of the reaction products.

Inside the bottoms 3 and 4, chambers 14 and 15 are formed for collecting the heat exchange fluid entering and exiting from the heat exchange unit 5, respectively. The tubular plates 7 and 8 separate the reaction zone 9 from the chambers 14 and 15.

In accordance with the present invention, suitable portions 6a, 6b of the heat exchangers 6 are advantageously thermally insulated.

In particular, in accordance with a preferred embodiment, shown in greater detail in FIG. 2, the heat exchangers 6 are coated at the portions 6a and 6b with layers 16', 16" of insulating material of different thickness. The thickness of the layer 16" of insulating material which coats the exchanger portion 6b is indeed greater with respect to the thickness of the layer 16' of insulating material which coats the exchanger portion 6a.

In the portion 6b and, to a lesser extent, in the portion 6a, the heat exchange coefficient is thus suitably reduced with respect to the rest of the heat exchanger 6.

It should be noted how in the example of FIGS. 1 and 2, the thermally insulated portions 6a and 6b of the heat exchangers 6 extend in critical areas 9a of the reaction zone 9. These areas are localized in the lower part of the reaction zone and near to the exchangers 6, i.e. where the temperature of the operating fluid just fed into the heat exchange unit 5 is very different (greater or lesser) with respect to the temperature in the reaction zone 9.

In fact, the temperature of the heat exchange operating fluid entering into the heat exchangers 6 through the lower tube plate 7 must be such as to allow the desired amount of heat to be removed from or, respectively, supplied to the upper part of the reaction zone 9 where the "fresh" reactant fluid is fed (through the nozzle 12). That is where there is the greatest exothermal or endothermal degree of the chemical reaction with the concentration of the reactant fluid being at its highest. This results in the fact that in the lower part of the reaction zone 9 and in particular near the heat exchangers 6, the temperature difference between heat exchange zone 9 and heat exchange operating fluid is very high and increases as one gets closer to the lower tubular plate 7.

The greater the aforementioned temperature difference, the greater the thickness of the layer 16', 16" of insulating material and therefore the thermal insulation of the exchangers 6 required for the purposes of the present invention.

Figure 3:
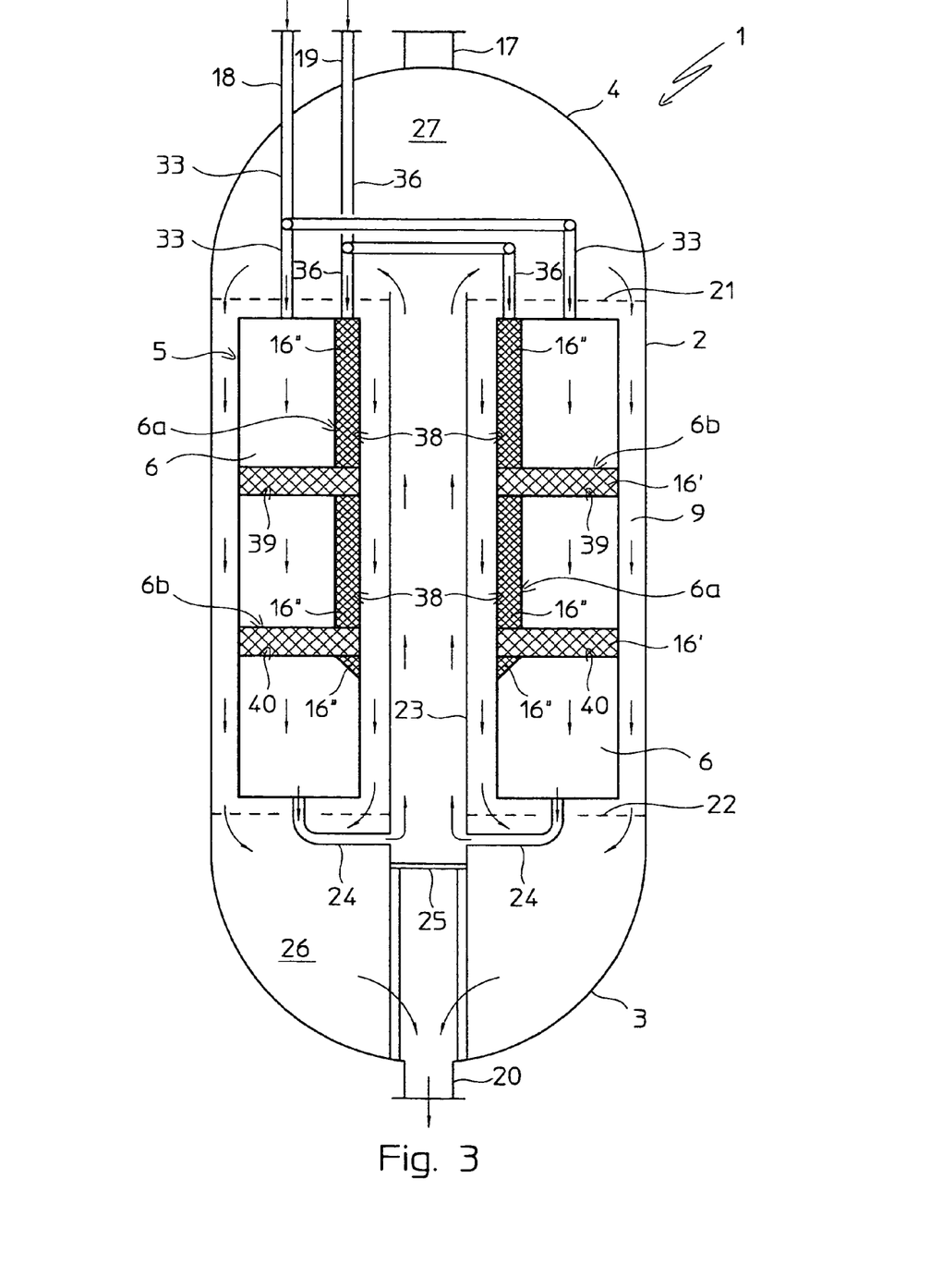
FIG. 3 schematically shows a longitudinal section view of a reactor for carrying out exothermic or endothermic chemical reactions comprising a further heat exchange unit which can be used for carrying out the method according to the present invention.
Figure 4:
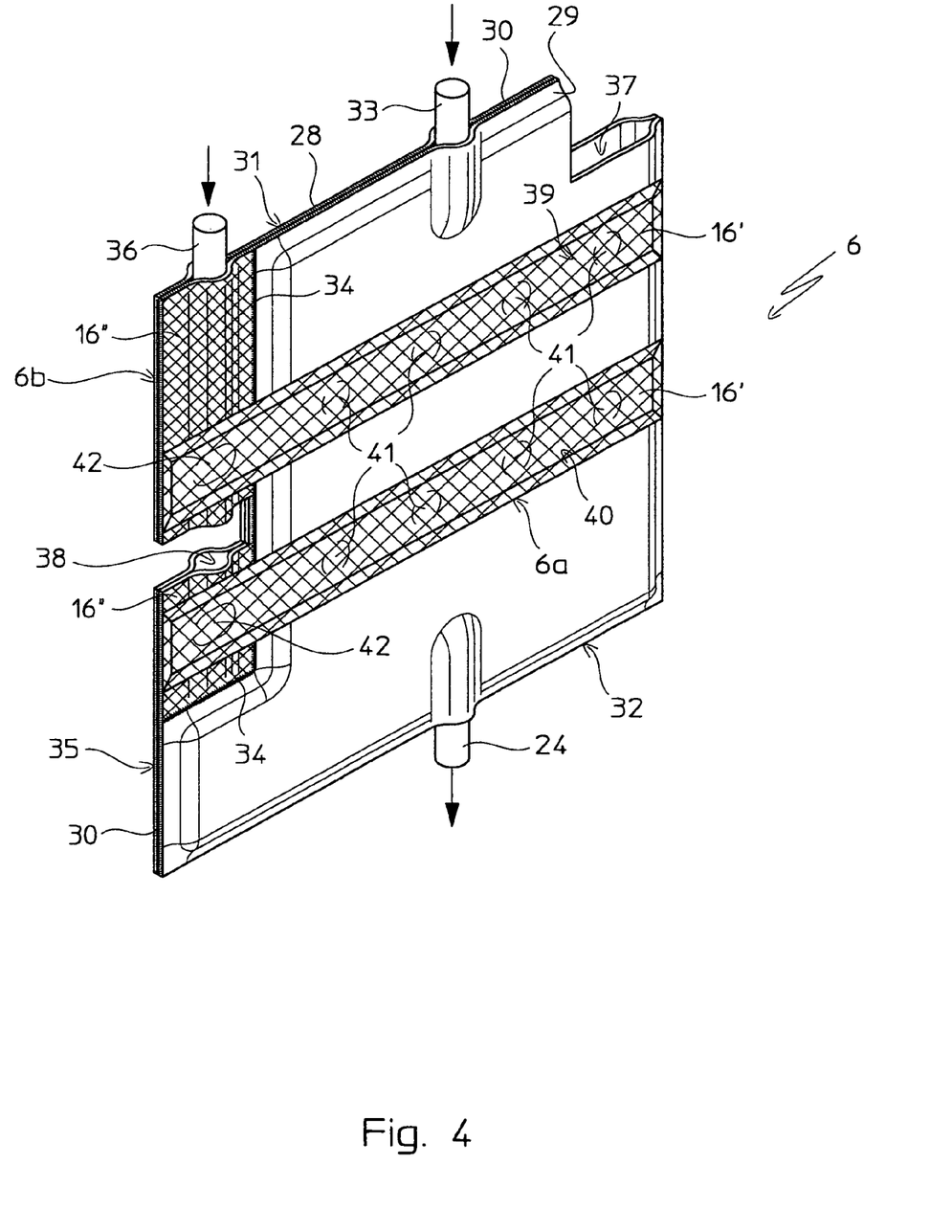
FIG. 4 schematically shows an enlarged and perspective view of a detail of the heat exchange unit of FIG. 3.

With reference to FIGS. 3 and 4, a pseudo-isothermal reactor 1 for carrying out exothermic or endothermic reactions is represented incorporating a heat exchange unit 5 according to an alternative embodiment of the present invention which is described hereafter.

In such figures, the details of reactor 1 which are structurally and functionally equivalent to those illustrated in the previous figures are indicated with the same reference numbers and are not described any further.

According to this embodiment, the upper bottom 4 is equipped with a man hole 17 of a predetermined transversal size and two nozzles 18 and 19, respectively, for the introduction into the heat exchange unit 5 of two distinct flows of a heat exchange operating fluid. Operating fluid, which in this specific case also corresponds to the reactant fluid, as can be seen in the rest of the description.

A nozzle 20 is further provided in the lower bottom 3 for the outlet of the reaction products from the reactor 1.

Inside shell 2 is arranged the reaction zone 9, schematically contained within an upper line 21 and a lower line 22, to receive a catalytic bed, which is not described in detail since it is per se known.

The heat exchange unit 5, inserted in a mass of an appropriate catalyst, which is not represented, is supported in an per se conventional way in the reaction zone 9.

Said heat exchange unit 5 has a substantially cylindrical configuration and comprises a plurality of substantially flattened box-like plate-shaped heat exchangers 6, with a parallelepiped configuration, positioned next to one another in an arrangement with coaxial and concentric elements (substantially radial arrangement).

The reaction zone 9 is axially crossed by a cylindrical duct 23 in fluid communication with the heat exchangers 6 through respective tubular fittings 24 and with the reaction zone itself. To this end, the duct 23 is closed at a lower end by a bottom 25 whereas it is open at an upper end thereof.

Furthermore, inside the lower bottom 3 a chamber for collecting the reaction products is formed whereas inside the upper bottom 4 a chamber 27 for collecting the operating fluid, or rather the reactant fluid, is formed.

According to a preferred embodiment of the plate heat exchangers 6, represented in greater detail in FIG. 4, these exchangers have a flattened parallelepiped configuration, comprising two metallic sheets 28, 29, with a reduced thickness so as to be capable of being deformed plastically, mutually joined in substantial juxtaposition through a perimetric soldering 30. The perimetric soldering is carried out taking into account, at opposing sides 31, 32, of such sheets, of the presence of a tubular fitting 33 connected to the nozzle 18 and of the fitting 24 connected to the cylindrical duct 23, respectively.

Such sheets 28, 29 are further connected together by a substantially L-shaped soldering line 34, extending parallel to a side 35 of the exchanger 6, free of fluid inlet or outlet fittings and at a reduced distance from it. In the side 31 of the exchanger 6, and at such soldering 34, a further tubular fitting 36, connected to the nozzle 19 for the inlet of a second flow of operating fluid, is provided.

Through plastic deformation of such sheets 28, 29, obtained for example through the blowing between them of a pressurised fluid, in the exchanger 6 a chamber 37 is formed, intended to be crossed by the heat exchange operating fluid, and a duct 38, for the feed of said second flow of operating fluid. The duct 38 extends in the area comprised between such L-shaped soldering line 34 and the side 35 of the exchanger itself.

On one sheet, for example on sheet 29, of the exchanger 6, two or more distributors 39, 40 are fixed, in fluid communication both with the chamber 37, through a plurality of holes 41 formed in the sheet being considered, and with the feeding duct 38, through respective openings 42 provided in appropriate positions thereupon.

Differently to the tubular exchangers of FIGS. 1 and 2, the temperature of the heat exchange operating fluid in the plate exchangers 6 of FIGS. 3 and 4 is controlled through the introduction into the chamber 37, in predetermined points, of an operating fluid at a different temperature.

In other words, the second flow of operating fluid fed in the chamber 37 of the plate exchangers 6 through the nozzle 19, the fittings 36, the feeding duct 38 and the distributors 39, 40 (passing through holes 42 and 41), has a different temperature (greater or lesser) with respect to the temperature of the operating fluid flowing inside such a chamber 37, in order to control the temperature of such fluid and to allow a heat exchange with the reaction zone 9 which is constant and homogeneous for the whole of its length.

According to this embodiment of the exchangers 6, the presence of critical areas is limited to the portions of reaction zone 9 near the feeding duct 38 and to distributors 39, 40, where the temperature difference with the operating fluid is particularly high.

In accordance with the present invention, the feeding duct 38 and the distributors 39, 40 are appropriately thermally insulated through suitable layers 16', 16" of insulating material.

Preferably, the thickness of the layer 16" of insulating material which coats the feeding duct 38 is greater as compared to the thickness 16' of insulating material which coats distributors 39, 40, since also the temperature difference between the operating fluid and the reaction zone 9 is greater at the duct 38 with respect to the distributors 39, 40.

Figure 5:
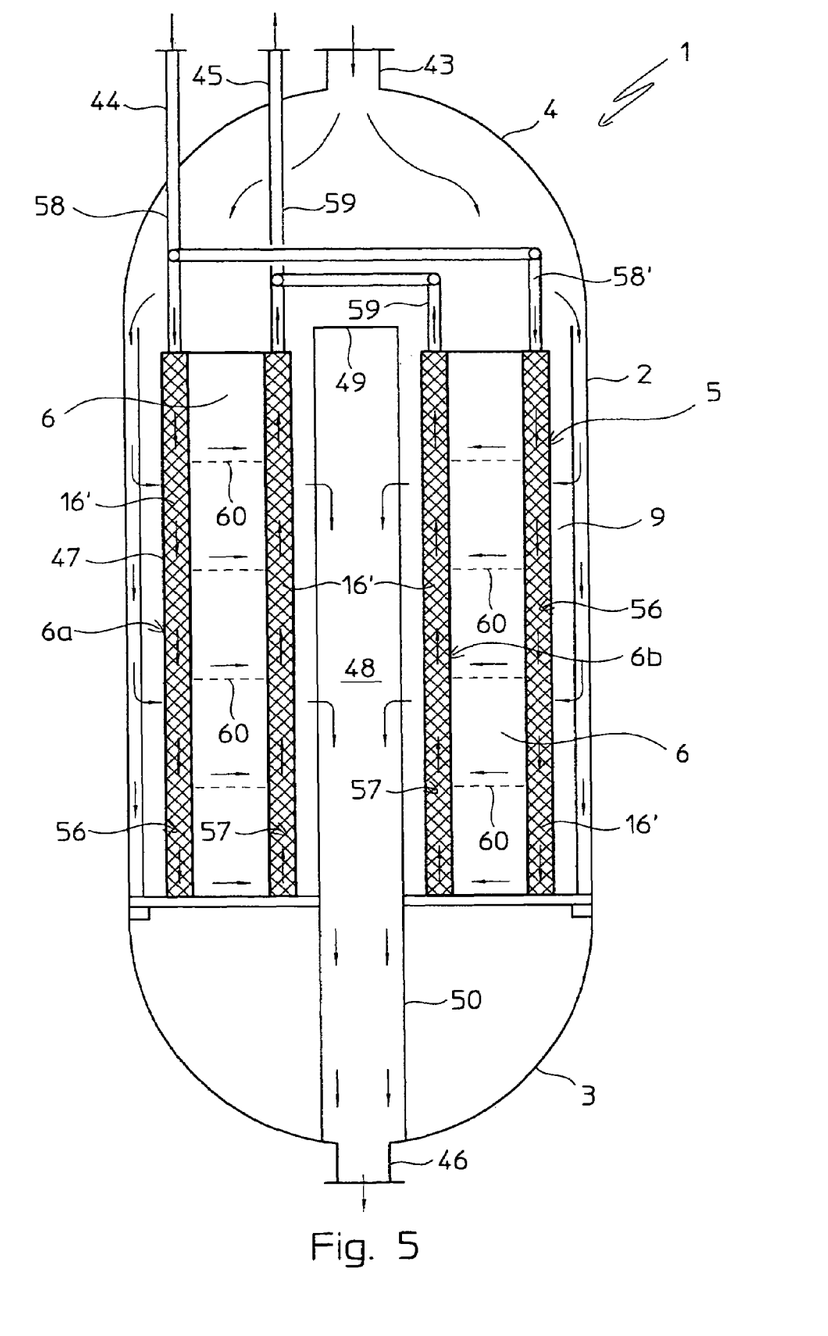
FIG. 5 schematically shows a longitudinal section view of a reactor for carrying out exothermic or endothermic chemical reactions comprising a further heat exchange unit which can be used for carrying out the method according to the present invention.
Figure 6:
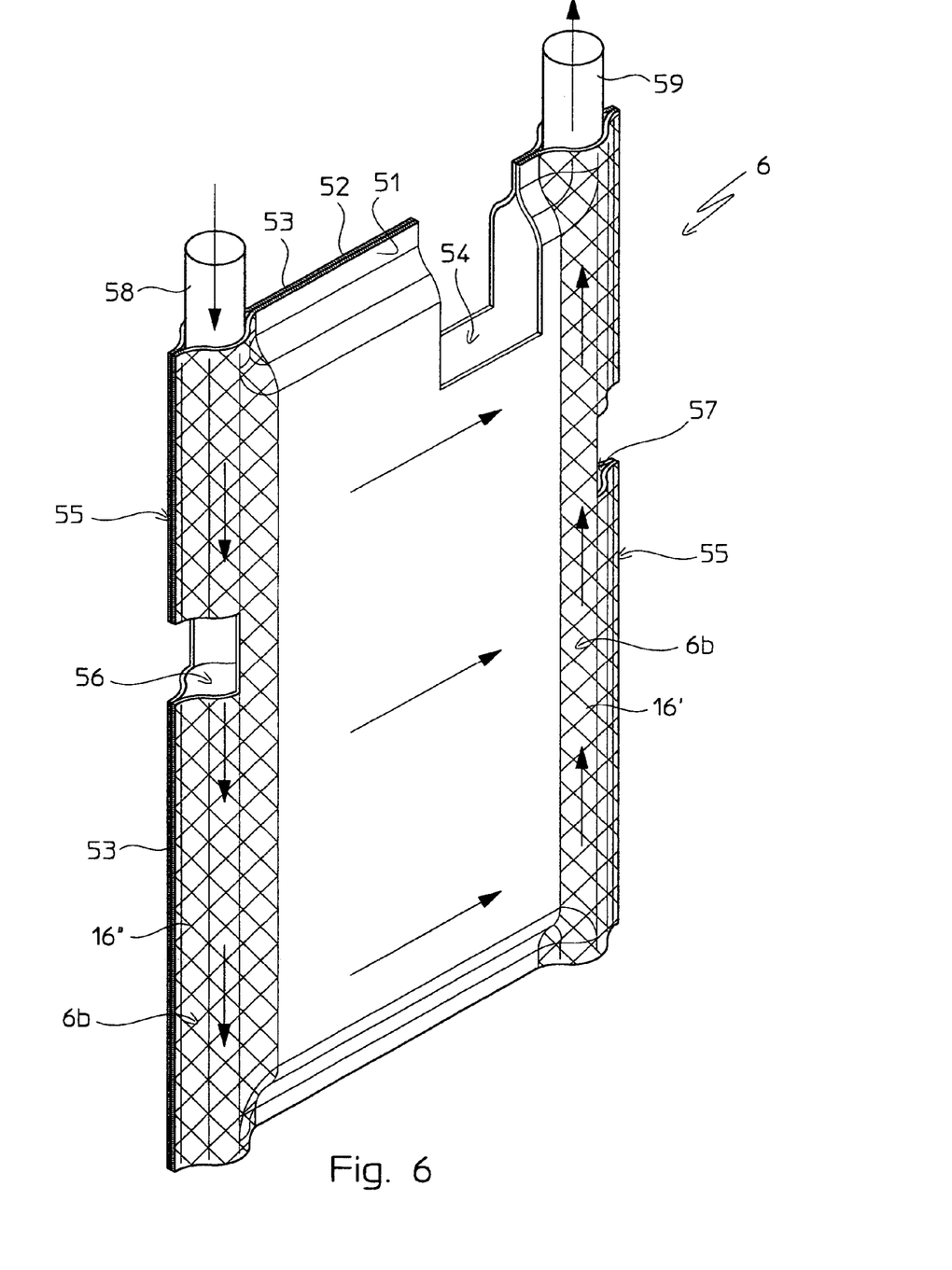
FIG. 6 schematically shows an enlarged and perspective view of a detail of the heat exchange unit of FIG. 5.

With reference to FIGS. 5 and 6, a pseudo-isothermal reactor 1 for carrying out exothermic or endothermic chemical reactions is represented incorporating a heat exchange unit 5 according to a further alternative embodiment of the present invention which is described hereafter.

In such figures, the details of the reactor 1 which are structurally and functionally equivalent to those illustrated in the previous figures are indicated with the same reference numbers and are not described any further.

According to this embodiment, the upper bottom 4 is equipped with a nozzle 43 for the inlet into the reactor 1 of a reactant fluid, and with nozzles 44, 45 for the introduction and the outlet of a heat exchange operating fluid into and from the heat exchange unit 5, respectively.

The lower bottom 3 is further equipped with a nozzle 46 for the outlet from the reactor 1 of the reaction products.

Inside the shell 2 is arranged the reaction zone 9 comprising a per se known annular catalytic bed that is open at the top and has perforated side walls for the passing through of the reactant fluid in a radial or axial-radial direction.

The inner side wall of the catalytic bed 47 forms a passage 48 inside of it, closed at the top by a cover 49 and in fluid communication—through a fitting 50—with the nozzle 46 for the outlet of the reaction products.

In the reaction zone 9, and more precisely inside the catalytic bed 47 the heat exchange unit 5, inserted in a mass of an appropriate catalyst, which is not represented, is supported in a per se conventional way.

In the same way as the example of FIG. 3, such heat exchange unit 5 has a substantially cylindrical configuration and comprises a plurality of substantially flattened box-like plate-shaped heat exchangers 6, with a parallelepiped configuration, positioned next to one another in an arrangement with coaxial and concentric elements.

More specifically (FIG. 6), each of the exchangers 6 preferably consists of a pair of metallic sheets 51, 52, juxtaposed, mutually joined, at a predetermined distance from each other, by perimetric soldering 53. So doing a chamber 54 is defined between such sheets, which is intended for the passage of a heat exchange operating fluid.

Each exchanger 6 is equipped at opposing long sides 55 with a distribution duct 56 and with a collector duct 57 for such operating fluid, respectively. The ducts 56, 57 are, on one side, in fluid communication with such a chamber 54 through at least one, but preferably through a plurality of openings or holes (not represented), which are provided along one or more generatrix of such ducts. On the other side, the ducts 56, 57 are in fluid communication with the external of the exchanger 6 through respective tubular fittings 58 and 59, for the inlet and outlet of such operating fluid. The fittings 58 and 59 are in turn connected with the nozzles 44 and 45, respectively.

To ease a crossing of the heat exchanger 6 in a radial or substantially radial direction by the heat exchange operating fluid, the chamber 54 is preferably subdivided into a plurality of compartments, not in direct communication with each other and obtained, for example, through a corresponding plurality of soldering lines 60 of the metallic sheets 51, 52, extending perpendicular to the distributor duct 56 and collector duct 57 of the exchanger 6.

Due to a decrease in the flow rate of the heat exchange operating fluid flowing inside the distributor duct 56 and collector duct 57 towards the bottom of the exchanger 6 and away from it, respectively, in the areas of the reaction zones 9 surrounding such ducts (critical areas) the heat exchange with the operating fluid is excessive, so as not to allow the desired control of the temperature in such critical areas of the reaction zone 9.

Consequently, in accordance with the present invention, the distributor duct 56 and the collector duct 57 of the heat exchangers 6 are suitably thermally insulated through an appropriate layer 16' of insulating material.

Figure 7:
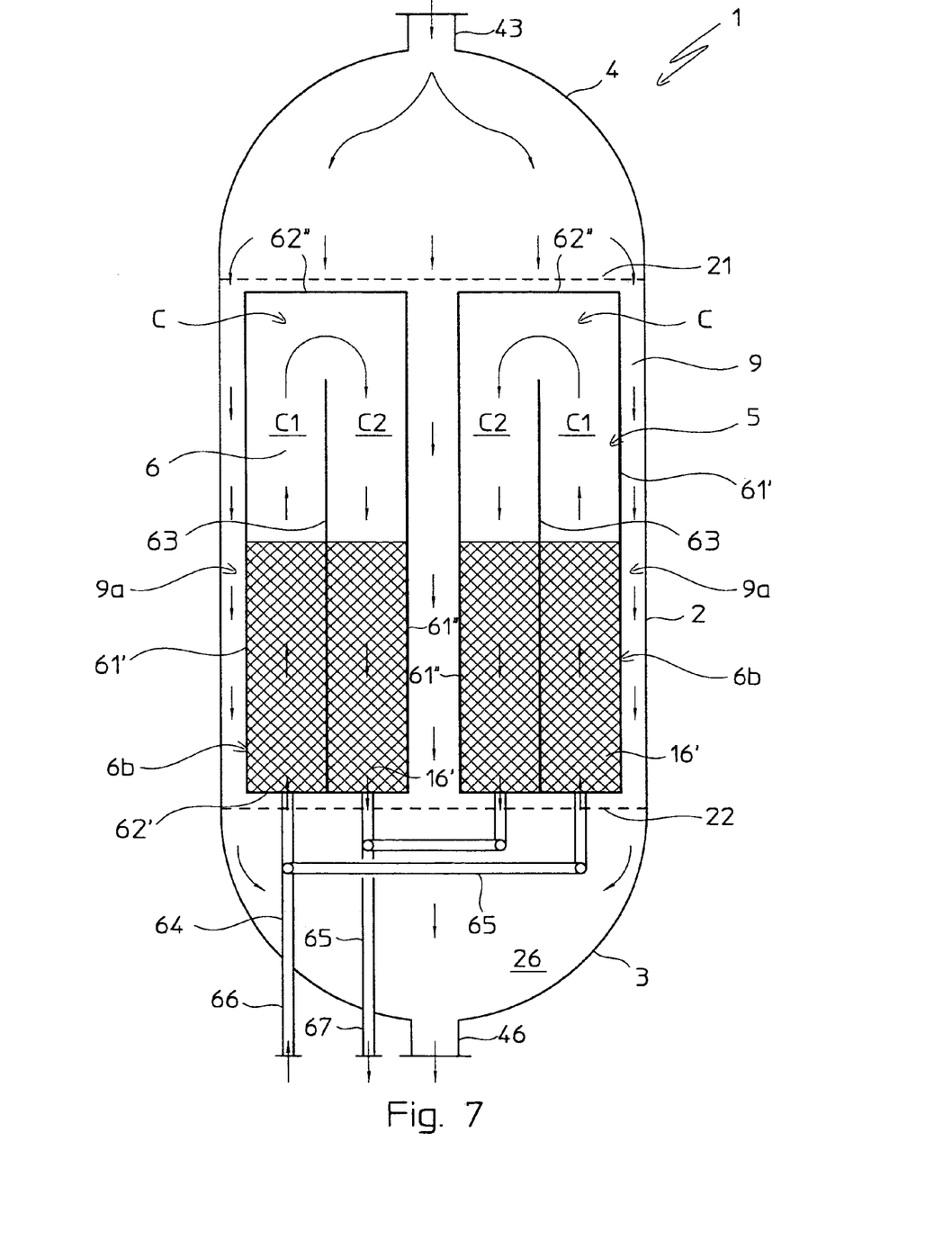
FIG. 7 schematically shows a longitudinal section view of a reactor for carrying out exothermic or endothermic chemical reactions comprising a further heat exchange unit which can be used for carrying out the method according to the invention.

With reference to FIG. 7, a pseudo-isothermal reactor 1 for carrying out exothermic or endothermic chemical reactions is represented incorporating a heat exchange unit 5 according to still another alternative embodiment of the present invention which is described hereafter.

In such figures, the details of reactor 1 which are structurally and functionally equivalent to those illustrated in the previous figures are indicated with the same reference numbers and are not described any further.

As for FIGS. 3 and 5, the heat exchange unit 5 has a substantially cylindrical configuration and comprises a plurality of substantially flattened box-like plate-shaped heat exchangers 6, with a parallelepiped configuration, positioned next to one another in an arrangement with coaxial and concentric elements. All of the exchangers 6 are arranged with the long sides 61', 61" parallel to the axis of shell 2 and the respective lower and upper short sides 62', 62" extending radially with respect to it.

In particular, the exchangers 6 consist of a pair of metallic sheets (not represented), juxtaposed, mutually joined, at a predetermined distance from each other, through perimetric soldering, so that between them a chamber C is defined, intended to be crossed by an operating heat exchange fluid.

Inside each exchanger 6 a separating baffle 63 is provided, extending from a short side 62' thereof and having a predetermined length which is lesser than that of the long sides 61', 61". The baffle. 63 extends in the same direction as said long sides 61', 61".

Preferably the separating baffle 63 is obtained through mutual soldering of the two sheets that form said exchanger 6, from an intermediate position of a short side 62' and extending towards the opposite short side 62", with respect to which it is separated by a predetermined distance.

Because of the presence of said separating baffle 63, the inner chamber of each exchanger 6 is subdivided into two contiguous parts C1, C2, in communication with each other only near the short side 62", opposite to the side 62', from which the baffle itself begins.

Each of the two parts C1, C2 of the chamber C of every exchanger 6, is in communication with the outside of the reactor 1 through respective tubular fittings 64, 65 in fluid connection with the nozzles 66 and 67, respectively, of the lower bottom 3.

In each exchanger 6, the aforementioned parts C1, C2 of the chamber C, define the ascending portion and the descending portion, respectively, of a substantially inverted U-shaped path, for a predetermined heat exchange operating fluid.

In the same way as the example of FIG. 1, the temperature difference between the operating fluid and the reaction zone 9 is particularly relevant in the lower part of such zone, near to the exchangers 6 (critical areas 9a).

In this respect, the lower part of the heat exchangers 6 is advantageously covered with a layer of insulating material 16' so as to suitably reduce the heat exchange coefficient in such a part and thus to keep the reaction temperature in the critical areas 9a within predetermined values.

In each of the aforementioned embodiments of the heat exchange unit 5 it is possible to carry out the method according to the present invention, in which the portions 6a, 6b of the heat exchangers extending in the critical areas 9a of the reaction zone are thermally insulated so as to reduce and control therein the heat exchange coefficient between the heat exchange operating fluid and such zone 9.

Doing so, a suitable reduction of the heat exchange coefficient is advantageously obtained at such portions 6a, 6b. It is: thus possible to keep the temperature in the critical areas 9a of the zone 9 within a very restricted range of values about a predetermined isotherm of reference. Thus allowing to obtain an advancement or completion of the chemical reaction also in such critical areas, to the great advantage of the overall conversion yield of the chemical reaction being considered.

Amongst the numerous advantages given by the method according to the present invention, it is worth citing the capability to obtain a greater conversion yield of the chemical reaction—with the same operating conditions—with respect to the yield that can be obtained with the methods of the prior art. Otherwise, with the same conversion yield, the present invention allows such a yield to be obtained with reactors and corresponding apparatuses of smaller dimensions (and thus less costly and consuming less energy) with respect to the reactors and the apparatuses of the prior art.

Preferably, the aforementioned insulation can be carried out through a covering of such portions with one or more layers 16', 16" of different thickness of a thermally insulating material. As an alternative to the layers 16', 16" of insulating material of different thickness, the coating can be carried out with a single layer 16' of variable thickness.

Such a layer of insulating material can be applied to the inside and/or to the outside (as indicated in the examples of FIGS. 1-7) of the heat exchangers 6.

In this respect, particularly advantageous results were obtained by using ceramic coatings with low heat conductivity, based upon substances such as oxides of zirconium, of yttrium, of aluminum, of cerium, of magnesium or mixtures thereof.

Preferably, such substances are applied to the portions 6a, 6b of the exchangers 6 through plasma.

The thickness of the layer 16', 16" of insulating material can vary—for example—from a minimum of 50 μm for the portions 6b to a maximum of 800 μm for the portions 6a of the exchangers 6, preferably between 100 and 500 μm.

The invention thus conceived is susceptible to alternatives and modifications all falling within the scope of protection defined by the following claims.

For example, according to an alternative embodiment of the present invention, which is not represented, the thermal insulation of the heat exchangers 6 can be obtained through insulating sheaths, double tubes, or other insulating materials of the conventional type.

As an alternative, it is even possible to provide heat exchangers 6 comprising—in a single piece—portions 6a, 6b having a different heat exchange coefficient from the heat exchange coefficient of the rest of the exchanger. For such a purpose, exchangers 6 can be manufactured with bi-metallic materials or else with materials having a different degree of heat conduction.

The invention claimed is:

1. A method for controlling the pseudo-isothermicity of a chemical reaction in a respective reaction zone in which heat exchangers are used, the heat exchangers having an operating heat exchange fluid flowing through them and in which critical areas are identified, the method comprising the step of:

reducing and controlling, in the critical areas of the reaction zone, the value of a heat exchange coefficient between the operating fluid and the reaction zone, through thermal insulation of the portions of the heat exchangers extending in the critical areas, wherein the thermal insulation of the portions of the exchangers is carried out through the application on the portions of at least one layer of thermally insulating material; and wherein a plurality of layers of insulating material of different thickness or a single layer of insulating material of variable thickness is applied on the portions of the exchangers.

2. The method according to claim 1, wherein the at least one layer of insulating material is applied to the outside and/or to the inside of the exchangers at the portions.

3. The method according to claim 1, wherein the at least one layer of insulating material has a thickness between 50 and 800 μm.

4. The method according to claim 3, wherein the at least one layer of insulating material has a thickness between 100 and 500 μm.

5. The method according to claim 1, wherein the at least one layer of insulating material comprises a ceramic material based upon oxides of zirconium, of yttrium, of aluminum, of cerium, of magnesium or mixtures thereof.

6. The method according to claim 5, wherein the at least one layer of insulating material is applied on the portions of the heat exchangers through plasma.

\* \* \* \* \*